(12) United States Patent
Deng et al.

(10) Patent No.: US 7,901,145 B2
(45) Date of Patent: Mar. 8, 2011

(54) MINI OPTICAL SUBASSEMBLY

(75) Inventors: Hongyu Deng, Saratoga, CA (US);
Maziar Amirkiai, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 138 days.

(21) Appl. No.: 12/049,123

(22) Filed: Mar. 14, 2008

(65) Prior Publication Data
US 2009/0232456 A1   Sep. 17, 2009

(51) Int. Cl.
*G02B 6/36* (2006.01)
(52) U.S. Cl. .................. 385/88; 385/53; 385/89; 385/90; 385/91; 385/92
(58) Field of Classification Search .............. 385/53, 385/88, 89, 90, 91, 92
See application file for complete search history.

(56) References Cited

U.S. PATENT DOCUMENTS

| 6,921,213 | B2 | 7/2005 | Rosenberg et al. | |
| 6,955,482 | B2 | 10/2005 | Rosenberg et al. | |
| 7,309,168 | B2 * | 12/2007 | Momiuchi et al. | 385/78 |
| 2003/0068059 | A1 * | 4/2003 | Blok et al. | 381/361 |
| 2006/0198576 | A1 * | 9/2006 | Furusawa et al. | 385/24 |
| 2007/0159773 | A1 * | 7/2007 | Deng et al. | 361/600 |

OTHER PUBLICATIONS

U.S. Appl. No. 12/049,082 Office Action dated Nov. 16, 2009.
U.S. Appl. No. 12/049,082 Office Action dated Aug. 26, 2009.
U.S. Appl. No. 12/049,082 Office Action dated Jun. 10, 2009.
U.S. Appl. No. 12/049,082 Office Action dated Feb. 5, 2009.
U.S. Appl. No. 12/049,082 Office Action dated Aug. 28, 2008.
U.S. Appl. No. 12/049,062 Office Action dated Dec. 10, 2009.
U.S. Appl. No. 12/049,062 Office Action dated Jun. 11, 2009.
U.S. Appl. No. 12/049,062 Office Action dated Feb. 5, 2009.
U.S. Appl. No. 12/049,062 Office Action dated Aug. 28, 2008.
Notice of Allowance and Issue Fee Due dated Jun. 25, 2010, U.S. Appl. No. 12/049,082.
Non-Final Office Action dated Jun. 21, 2010, U.S. Appl. No. 12/049,062.

* cited by examiner

*Primary Examiner* — Jennifer Doan
(74) *Attorney, Agent, or Firm* — Wyatt, Tarrant & Combs, LLP; William S. Parks

(57) ABSTRACT

A low-cost, high-speed micro-connector replacement for current electrical inter-connects and intra-connects on printed circuit boards is provided. The invention achieves its goal by including an optical transmitter module or optical receiver module mounted in close proximity to a modulator used to encode optical signals from electrical impulses or decode optical signals to electrical impulses. The micro-connector is mounted on a PCB in alignment with the transmitting or receiving modules and provides appropriate alignment and stop positioning of an optical fiber used for optical transmitting between transmitting/receiving modules.

6 Claims, 2 Drawing Sheets

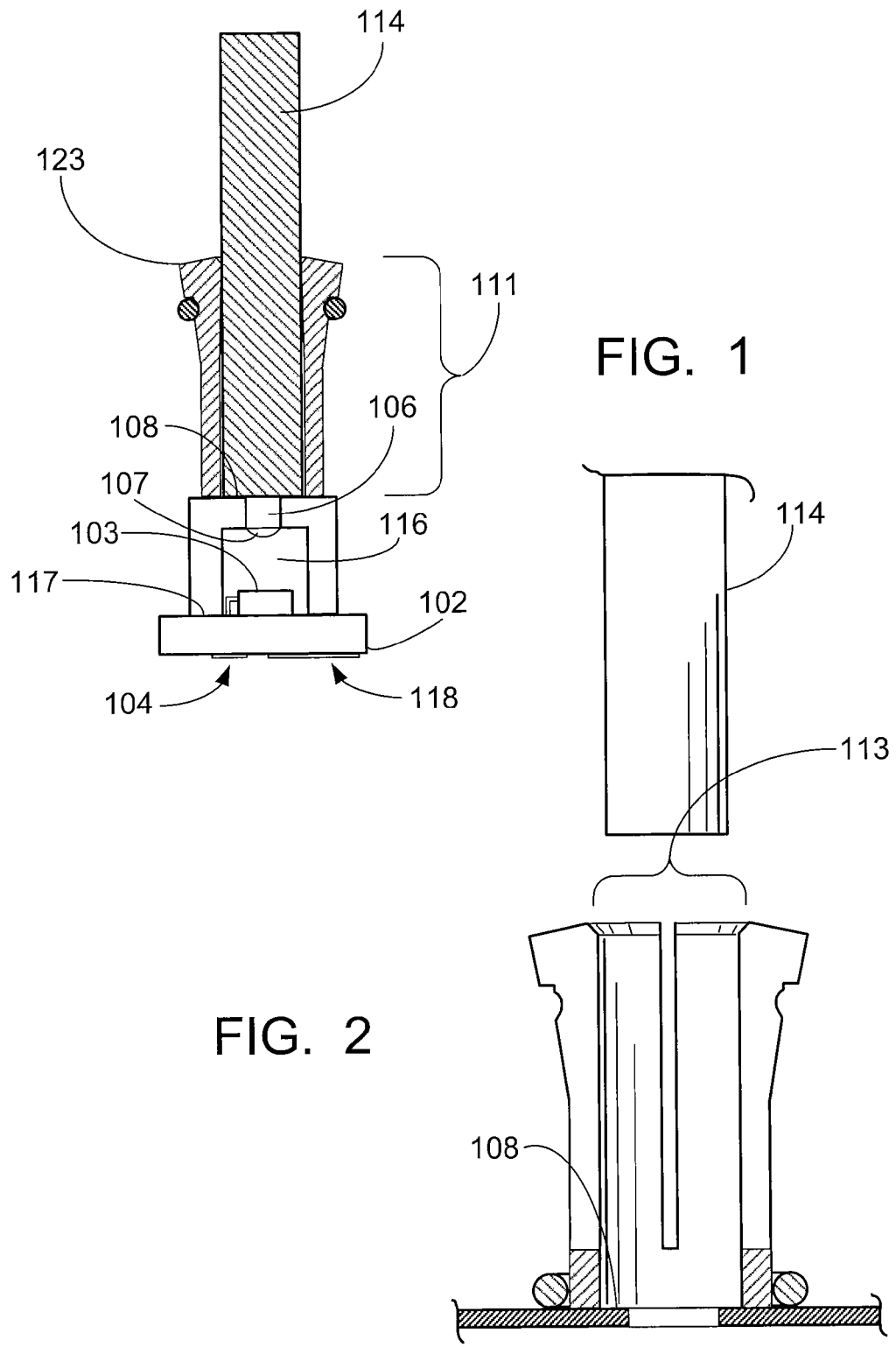

MINI OPTICAL SUBASSEMBLY

FIELD OF THE INVENTION

The present invention relates to an improved optical subassembly for coupling an optical transmission fiber to an optical device. More specifically, the present invention provides a reduced size optical subassembly which is meant to couple a bare optical fiber to an optical device. The invention achieves its goal by including an optical transmitter module or optical receiver module mounted in close proximity to a modulator used to encode optical signals from electrical impulses or decode optical signals to electrical impulses. The micro-connector is mounted on a PCB in alignment with the transmitting or receiving modules and provides appropriate alignment and stop positioning of an optical fiber used for optical transmitting between transmitting/receiving modules.

BACKGROUND OF THE INVENTION

As future high speed computing technologies find a need to transfer large amounts of data from point to point between electronic components, technologies will have to adapt in order to satisfy this requirement. The common solution today is to carry inter-circuit and intra-circuit signals via traditional electrical conductors. As processing speeds increase, however, the skin effect of high frequency signals can create a host of problems including high resistance, large power consumption, and limited signal transmission distance making traditional electrical transmissions unusable.

In recent years, increased attention has been focused on optical interconnects as a means to solve the problems encountered with traditional electrical connections. Optical transmitters convert electrical data signals into optical signals which may be carried over optical fiber to an end point where an optical receiver converts the optical signal back to electrical impulses. These optical transmitters and receivers are usually found packaged as a complete optical assembly comprising a transmitting optical subassembly or TOSA, and in the case of an optical receiver, the optical assembly comprises a receiving optical subassembly, or ROSA. Using a typical TOSA as an example, the subassembly acts as an interface between the electrical data communication medium and the optical data communication medium. The TOSA occupies the physical space between the optoelectronic circuitry and the optical fiber. It provides not only the physical structure to couple the optical output signal of the transmitter to an optical fiber, but also acts to align and focus the optical signal on the end of a fiber such that the light signal enters the fiber and is transmitted to a remote location where it is then converted back to an electronic signal.

While optical connections quickly help to eliminate any problems associated with high speed communications, they have always been associated with a high cost of implementation. In fact, in an effort to help advance the relevant Art in the field, intense research has been underway in the field of silicon photonics which uses silicon as a substrate to generate, modulate, and transmit optical signals using low cost and easily produced components. However, until now there has not been an adequate low cost and small form-factor optical interconnect solution.

ADVANTAGES AND SUMMARY OF THE INVENTION

One advantage of the present invention is the ability to couple a bare optical fiber to a Mini Optical Subassembly ("MOSA") for faster transmission of information at a reliable level for optical medium utilization. Additionally, another advantage is that the reduced size of the optical subassembly further allows for new applications of optical transmission and the assembly of a large number of units on a single sub-mount wafer, thereby reducing the overall cost of production.

Accordingly, this invention encompasses a mini optical subassembly comprised of an optical package at a first end and an optical micro-connector receiving a bare optical fiber at a second end. A method of transferring information through converting electrical impulses into optical signals between two printed circuit boards via such a subassembly is also encompassed within this invention.

As noted above, this invention relates to an improved optical subassembly for coupling the optical signal of an optical transmitter or receiver to an optical medium such as an optical fiber. More specifically, the invention relates to a Mini Optical Subassembly ("MOSA") which allows for the coupling of a bare optical fiber and its utilization as an optical medium. In all embodiments of the invention, the MOSA is comprised of an optical package at a first end and an optical micro-connector for receiving a bare optical fiber at a second end. The optical package preferably includes a submount assembly composed of ceramic, silicon, glass, or other appropriate material with a first side consisting of electrical leads which extend from the submount and may be connected to laser drive circuitry for a transmitter assembly or receiver circuitry for a receiver assembly. The second side of the submount assembly is composed of a laser or detector mounted directly to the submount. A cap is optionally attached to protect the laser or detector.

The second end of the MOSA defines an optical alignment bore into which a bare optical fiber may be inserted, and which is mounted to the optical package in alignment with the optical transmitter or receiver. The optical alignment bore is machined or molded to positively position the bare optical fiber over the optical transmitter or receiver located on the submount. Additionally, the optical alignment bore may also contain a lens structure used to focus the optical signal traveling through the optical fiber. Finally, a retaining mechanism projects from the open end of the optical alignment bore opposite the optical subassembly and serves to prevent the unintended removal of the bare optical fiber. A tool may be used to release the retaining mechanism and allow for the easy insertion or removal of a bare optical fiber.

In an example of a potentially preferred transmitting embodiment of the invention, a bare optical fiber is inserted into the optical alignment bore such that the polished end of the optical fiber is axially aligned with the inner passage of the bore. A laser or other light emitting device known to those skilled in the art, is attached to the sub-mount and axially aligned with the optical alignment bore. The laser converts a signal consisting of electrical impulses and outputs an optical signal. From the optical package the optical output signal is then radiated toward the bare optical fiber. The signal is subsequently carried by the bare optical fiber to a receiving element at an end point.

In an example of a potentially preferred receiving embodiment, a bare optical fiber is inserted into the optical alignment bore such that the polished end of the optical fiber is axially aligned with the inner passage of the bore and the optical package. The optical fiber carries an optical signal from a remote transmitter and the optical signal exits the fiber and is radiated to the optical receiver which converts the signal to electrical impulses.

In a further potentially preferred embodiment, there is provided an optical package according to the prior embodiments and an optical connector, wherein a lens assembly fabricated from glass, plastic, or other suitable material is capable of being disposed between the bare optical fiber which is inserted into the optical alignment bore and the optical package. An optical signal radiated by the optical package is transmitted through the lens element which focuses the optical signal to a small point at the polished end of the bare optical fiber, allowing the optical signal to be directed as it enters the fiber.

BRIEF DESCRIPTION OF THE DRAWINGS

To further clarify the above and other advantages and features of the present invention, a more particular description of the invention will be rendered by reference to example embodiments thereof which are illustrated in the appended drawings. These drawings depict only example embodiments of the invention and are not to be considered limiting in their scope. A brief description of each drawing is included below.

FIG. 1 is a cross sectional view of a Mini Optical Subassembly in accordance with the present invention;

FIG. 2 is a schematic diagram showing the receiving structure according to the preferred embodiments of the present invention;

DETAILED DESCRIPTION OF THE INVENTION AND PREFERRED EMBODIMENTS

Figure 3:
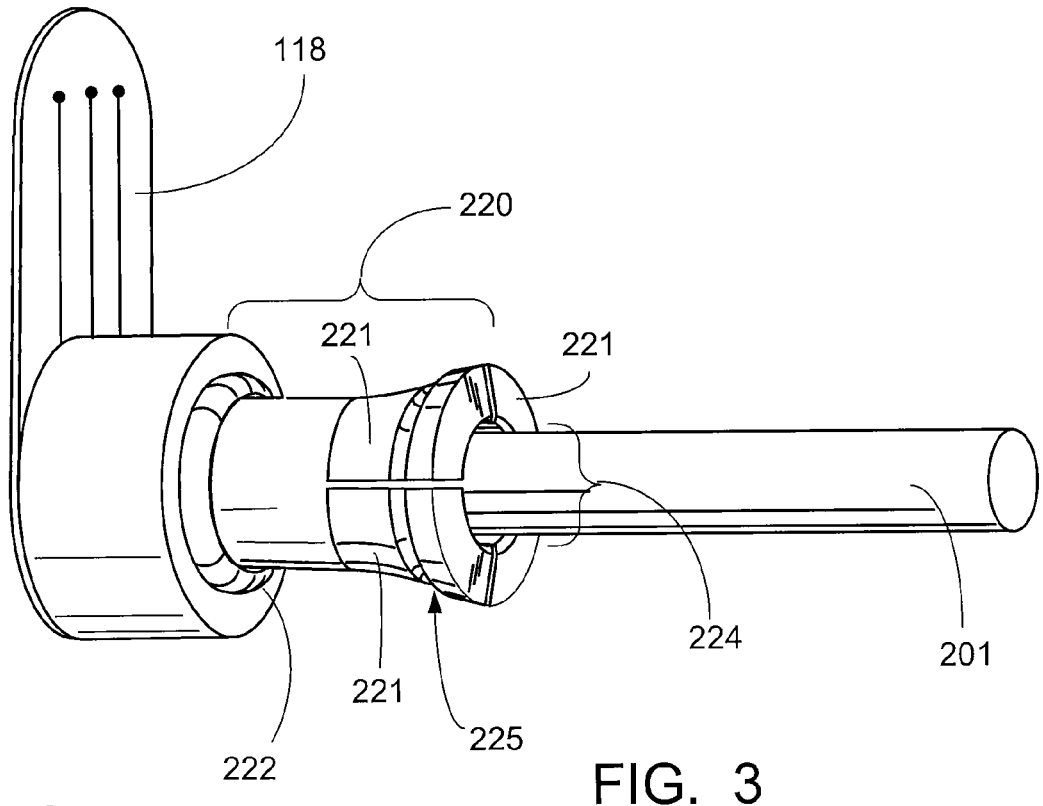
FIG. 3 is a perspective view showing the receiving structure upon insertion of the bare optical fiber.

Detailed embodiments of the present invention are disclosed herein; however, as will be readily apparent to those skilled in the art, the present invention may be produced in other specific forms without departing from its spirit or essential characteristics. The present embodiments, are therefore, to be considered as illustrative and not restrictive, the scope of the invention being indicated by the claims rather than the following description, and all changes which come within the meaning and range of the equivalence of the claims are therefore intended to be embraced therein.

Referring to FIGS. 1 and 2, a MOSA according to a first embodiment of the invention is shown. The MOSA includes a housing comprised of a first end 111 which define a bore 113 for receiving a bare optical fiber 114 (no ferrule or other cap or connector necessary). The precise inner diameter of the bore 113 allows the bare optical fiber 114 to be accurately and repeatably located relative to the corresponding alignment structures such as the bore 113 of the housing. As shown in FIG. 2, the transverse end of a bare optical fiber 114 inserted into the receiving bore 113 abuts a small shoulder 108 located at the distal end of the bore 113. This small shoulder 108 acts as a stop, preventing further insertion of the bare optical fiber 114 into the bore 113.

Still referring to FIGS. 1 and 2, located on the submount 102 are metal traces and vias 104 which allow electrical connection to and from the optical transmitter/receiver 103. The housing further includes a second end which defines a cavity 116 to house an optical element 103 such as an LED or semiconductor laser. One such preferred optical element 103 is a VCSEL but it will be understood to those skilled in the art, in view of the disclosure herein, that the optical element can include a wide variety of devices in any number of configurations for either transmitting or receiving optical signals. The optical element 103 is mounted directly to a submount 102 which may be constructed from ceramic, silicon, glass, or other appropriate materials. Additionally, a transparent protective covering 106 is mounted over the optical element 103 with a clear transparent window allowing the optical signal emitted by the optical element 103 to radiate to the optical fiber 114. The optical element 103 affixed to a submount 102 to which it is attached 117 using solder, epoxy, or a variety of additional methods known to those skilled in the art. The light generated from a transmitting optical element 103 radiates and must first traverse the transparent protective covering 106, which is constructed of glass, plastic, or any other durable material which allows light to traverse and which is know to those skilled in the art. The transparent protective covering 106 is primarily used to shield the optical element 103 from damage.

Referring to FIGS. 1, 2, 3, and 4, electrical leads 104 extending from the optical element 103 protrude through the submount 102 assembly. These electrical leads 104 which allow for electrical impulses to be transmitted to the optical element 103 for conversion to an optical signal, are coupled to metallic pathways 118 etched on the submount assembly 102 for further transmission of electrical impulses to and from PCB components. When an electrical signal meant for transmission via the optical pathway is created, it is first channeled via the metallic pathways 118 on the submount assembly 102 to the optical element 103. The optical element 103 converts the electrical impulse to an optical signal which is then radiated and focused to a narrow point of light coinciding with the position of the bare optical fiber 114. In some embodiments, the optical signal must first traverse an optical lens 107. In the preferred embodiment, the lens 107 comprises a spherical ball lens. The lens cavity may be formed within the structure to hold the lens within the cavity between the optical element 103 and the bare optical fiber 114. Such lens retention features may include compressible protuberances lining the opening to the cavity or angled support walls. An internal passage connects the lens cavity to the bare optical fiber bore 113 such that an optical signal may be transmitted from the optical element 103 through the ball lens to the bare optical fiber bore 113. When the elements of the second end 112 are properly aligned, the optical element 103, the lens 107, and the bare optical fiber 114 define an optical axis extending through the assembled MOSA.

Figure 4:
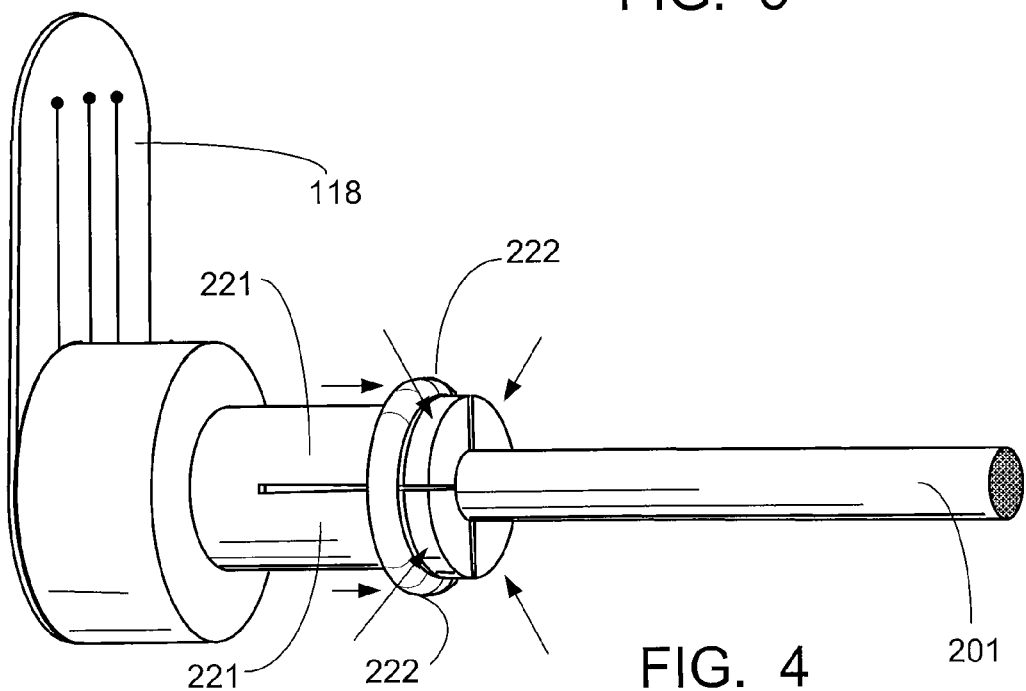
FIG. 4 is a perspective view showing the receiving structure upon insertion of the bare optical fiber and upon engagement of the retaining mechanism.

Referring to FIGS. 2, 3, and 4, the optical fiber 201 receiving structure is disposed distal to the PCB 208 and is comprised of a bore 220 for receiving a bare optical fiber 201. The bore 220 is formed by separate individual leg members 221 bound by a resilient retaining mechanism 222 and having a head portion integrally formed to a proximal end for insertion of the bare optical fiber 201 within the aperture 224. In order to retain the resilient retaining mechanism 222 the individual leg members 221 are formed to include some type of retaining flange 225 along the end proximate to the aperture 224 of the bore 220. The precise inner diameter of the bore 220 allows the bare optical fiber 201 to be accurately and repeatably located relative to the corresponding alignment structures such as the bore 220. The transverse end of a bare optical fiber 201 inserted into the receiving bore 220 abuts a small shoulder 108 located at the distal end of the bore 220. This small shoulder 108 acts as a stop, preventing further insertion of the bare optical fiber 201 into the bore 220.

Although four leg members 221 are illustrated, the number of leg members 221 may vary. Additionally, it is to be understood that the particular type of retaining mechanism 222 may vary so long as it functions as described herein.

As FIGS. 3 and 4 illustrate, when the retaining mechanism 222 is disposed distal to the aperture 224 used for insertion of the bare optical fiber 201, the individual leg members 221 are uncompressed and allow for insertion of the fiber 201. Upon insertion of the bare optical fiber 201, the retaining mechanism 222 moves along the individual leg members in the direction of the aperture 224 until it sits against the retaining flanges 225 located on the individual leg members 221. Upon relocation of the retaining mechanism 222 the individual leg members 221 are compressed and retain the bare optical fiber 201 in the bore 220 assembly. This compression of the individual leg members 221 shall inhibit the removal of the bare optical fiber 201 with a predetermined retention force which varies with the type of material and retaining mechanism utilized.

Information is transferable via these devices depicted in FIGS. 1, 2, 3 and 4 at a rate of at least 10 Gb/s and multiples of 10 Gb/s (100 Gb/s, etc.). Such rates have been unattainable without micro-connections in the past. Such configurations thus accord the industry a heretofore unknown manner of providing improvements in information transfer.

While the invention was described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalents thereto.

The invention claimed is:

1. A mini optical subassembly comprised of an optical package at a first end and an optical micro-connector receiving a bare optical fiber at a second end; wherein said optical micro-connector includes a bore into which said bare optical fiber is received and which includes a movable retaining mechanism external to said bore in order to secure and release said bare optical fiber when received within said bore; and wherein said optical micro-connector comprises a lens and a transparent protective cover in direct contact with said lens such that when said bare optical fiber is received therein, said bare optical fiber is in direct contact with said protective cover.

2. The subassembly of claim 1 wherein said optical package comprises a submount assembly including a) a first side comprising electrical leads which extend from the submount and connected to either laser drive circuitry for a transmitter assembly or receiver circuitry for a receiver assembly and b) a second side comprising a laser or detector mounted directly to said submount.

3. The subassembly of claim 2 wherein said submount assembly is composed of material selected from the group consisting of ceramic, silicon, and glass.

4. A method of transferring information through converting electrical impulses into optical signals between two printed circuit boards via the subassembly of claim 1.

5. A method of transferring information through converting electrical impulses into optical signals between two printed circuit boards via the subassembly of claim 2.

6. A method of transferring information through converting electrical impulses into optical signals between two printed circuit boards via the subassembly of claim 3.

* * * * *